United States Patent
Della-Fera et al.

(10) Patent No.: US 9,145,787 B2
(45) Date of Patent: Sep. 29, 2015

(54) ROTATABLE COMPONENT, COATING AND METHOD OF COATING THE ROTATABLE COMPONENT OF AN ENGINE

(75) Inventors: Gabriel Della-Fera, Greenville, SC (US); Thomas Moors, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 777 days.

(21) Appl. No.: 13/211,889

(22) Filed: Aug. 17, 2011

(65) Prior Publication Data

US 2013/0045091 A1 Feb. 21, 2013

(51) Int. Cl.
| | | |
|---|---|---|
| F01D 11/12 | (2006.01) | |
| B32B 5/16 | (2006.01) | |
| B32B 7/06 | (2006.01) | |

(52) U.S. Cl.
CPC ............ *F01D 11/122* (2013.01); *Y10T 428/25* (2015.01); *Y10T 428/31504* (2015.04)

(58) Field of Classification Search
CPC .......... F01D 5/20; F01D 5/288; F01D 11/22; F05D 2230/31; F05D 2230/90
USPC ............ 415/9, 173.4, 174.4; 416/224, 229 R, 416/229 A, 241 R, 241 B
See application file for complete search history.

(56) References Cited

U.S. PATENT DOCUMENTS

| | | | |
|---|---|---|---|
| 4,867,639 A | 9/1989 | Strangman | |
| 5,599,166 A | 2/1997 | Deptowicz et al. | |
| 5,625,958 A | 5/1997 | DeCoursey et al. | |
| 5,644,394 A | 7/1997 | Owens | |
| 5,785,492 A | 7/1998 | Belsom et al. | |
| 6,102,656 A * | 8/2000 | Nissley et al. | 415/174.4 |
| 6,206,642 B1 | 3/2001 | Matheny et al. | |
| 6,485,262 B1 | 11/2002 | Heyward et al. | |
| 6,487,863 B1 | 12/2002 | Chen et al. | |
| 6,532,656 B1 | 3/2003 | Wilkins et al. | |
| 6,630,093 B1 * | 10/2003 | Jones | 264/401 |
| 6,641,907 B1 * | 11/2003 | Merrill et al. | 428/313.9 |

(Continued)

FOREIGN PATENT DOCUMENTS

| | | |
|---|---|---|
| CN | 1928148 A | 3/2007 |
| DE | 3500692 A1 * | 7/1986 |
| EP | 1119429 B1 | 8/2001 |

OTHER PUBLICATIONS

G. Overton, Photonics Applied: Materials Processing: Laser additive manufacturing gains strength, Laser Focus World, Jun. 1, 2009, 1-4, http://www.optoiq.com/index/photonics-technologies-applications/lfw-display/lfw-articles--display/363486/articles/laser-focus-world/volume-45/issue-6/features/photonics-applied-materials-processing-laser-additive-manufacturing-gains-strength.html.

M. Shellabear et al., Advances in Materials and Properties of Direct Metal Laser-Sintered Parts, Oct. 25, 2007, 1-8, http://www.rm-platform.com/index2.php?option=com_docman&task=doc_view&gid=549&Itemid=5.

(Continued)

*Primary Examiner* — Igor Kershteyn
*Assistant Examiner* — Jesse Prager
(74) *Attorney, Agent, or Firm* — McNees Wallace & Nurick LLC

(57) ABSTRACT

A rotatable engine component, coating and method of coating the rotatable component includes a substrate, a transitional zone applied to the substrate, and an abradable zone applied to the transitional zone. During operation of an engine in a turbine, the abradable zone is consumed upon contact with a static portion of the engine preventing damage to the rotatable component.

17 Claims, 6 Drawing Sheets

(56) References Cited

U.S. PATENT DOCUMENTS

| | | | |
|---|---|---|---|
| 6,916,529 B2 * | 7/2005 | Pabla et al. | 428/325 |
| 7,032,279 B2 | 4/2006 | McCarvill et al. | |
| 7,824,733 B2 | 11/2010 | Hosenfeldt et al. | |
| 2002/0145258 A1 * | 10/2002 | Nava et al. | 277/415 |
| 2007/0104886 A1 * | 5/2007 | Buczek et al. | 427/458 |
| 2007/0160469 A1 * | 7/2007 | Ochiai et al. | 415/200 |
| 2009/0136740 A1 * | 5/2009 | Reynolds et al. | 428/325 |
| 2010/0050434 A1 | 3/2010 | Long | |
| 2010/0061862 A1 | 3/2010 | Bonini et al. | |
| 2010/0136296 A1 * | 6/2010 | Collins et al. | 428/174 |
| 2011/0103967 A1 * | 5/2011 | Hoebel et al. | 416/241 R |
| 2013/0004301 A1 * | 1/2013 | Strock et al. | 415/174.4 |

OTHER PUBLICATIONS

X. Lin et al.; Phase Evolution in Laser Solid Formed Compositionally Graded Ti60-Ti2AlNb Alloys, Archive for the 'Laser Additive Manufacturing' Category, Laser Institute of America, May 6, 2010, 1-7, https://www.laserinstitute.org/laserinsights/category/laser-additive-manufacturing/.

Selective laser sintering, Wikipedia, Feb. 18, 2011, 1-2, http://en.wikipedia.org/wiki/Selective_laser_sintering.

Translation of CN Office Action issued on Feb. 4, 2015 in relation to corresponding CN application 201210295452.8.

* cited by examiner

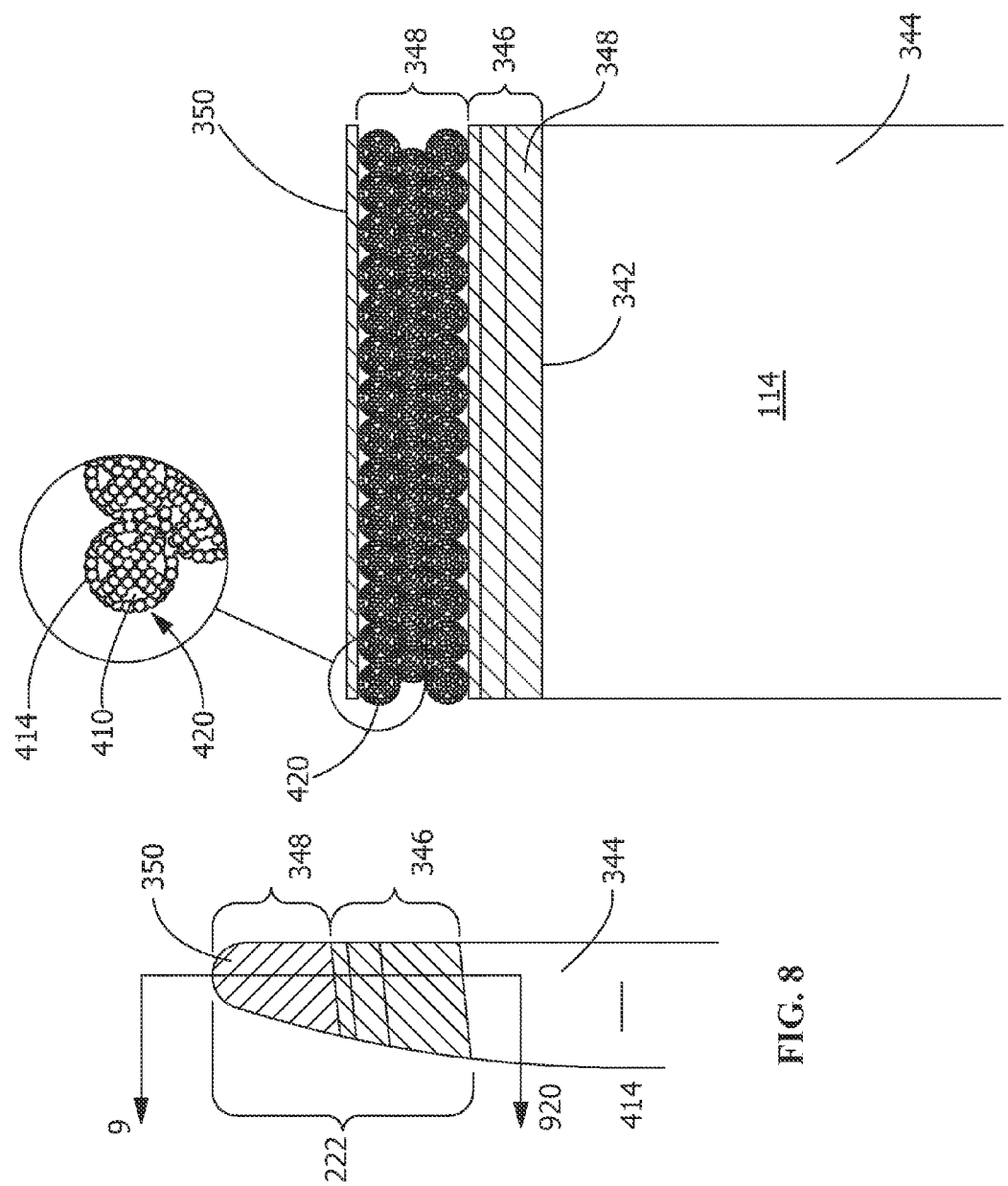

ROTATABLE COMPONENT, COATING AND METHOD OF COATING THE ROTATABLE COMPONENT OF AN ENGINE

FIELD OF THE INVENTION

The present invention relates generally to turbines, and more specifically to rotatable components, coating and method of coating the rotatable component of an engine in a gas turbine or steam turbine.

BACKGROUND OF THE INVENTION

Tip rub of the airfoil tip with the compressor casing causes detrimental effects, such as high loads transferred to the root of the airfoil, high heat transmitted to the airfoil blade material, which results in fatigue debit, and micro-cracking of the airfoil. Attempts to reduce efficiency debit from large clearances between the airfoil tip and casing, such as by providing abradable casings of case liners and oversized seals have been somewhat unsuccessful because these methods are subject to limitations such as complex repair procedures necessary to access the abradable case liner.

A rotatable component, coating and method of coating the rotatable components for engines that do not suffer from the above drawbacks is desirable in the art.

SUMMARY OF THE INVENTION

According to an exemplary embodiment of the present disclosure, a rotatable engine component is provided. The rotatable engine component includes a substrate, a transitional zone applied to the substrate, and an abradable zone applied to the transitional zone. The abradable zone is consumed upon contact with a static portion of the engine.

According to another exemplary embodiment of the present disclosure, a coating for a rotatable component is provided. The coating for the rotatable component includes a transitional zone applied to a substrate of the component and an abradable zone applied to the transitional zone. The abradable zone includes a plurality of abradable layers including a plurality of fused ultra fine powder particles, wherein the coating withstands rotational force and the abradable zone is consumed upon contact with a static portion of a gas turbine engine.

According to another exemplary embodiment of the present disclosure, a method of coating a rotatable engine component is provided. The method of coating the rotatable engine component includes providing the rotatable engine component having a substrate, applying a transitional zone to the substrate, and applying an abradable zone to the transitional zone. The abradable zone is consumed upon contact with a static portion of the gas turbine engine.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 8 is a schematic of a rotating airfoil of the present disclosure.

FIG. 9 is a section view taken along line 9-9 of rotating airfoil of FIG. 8 of the present disclosure.

Wherever possible, the same reference numbers will be used throughout the drawings to represent the same parts.

DETAILED DESCRIPTION OF THE INVENTION

Figure 1:
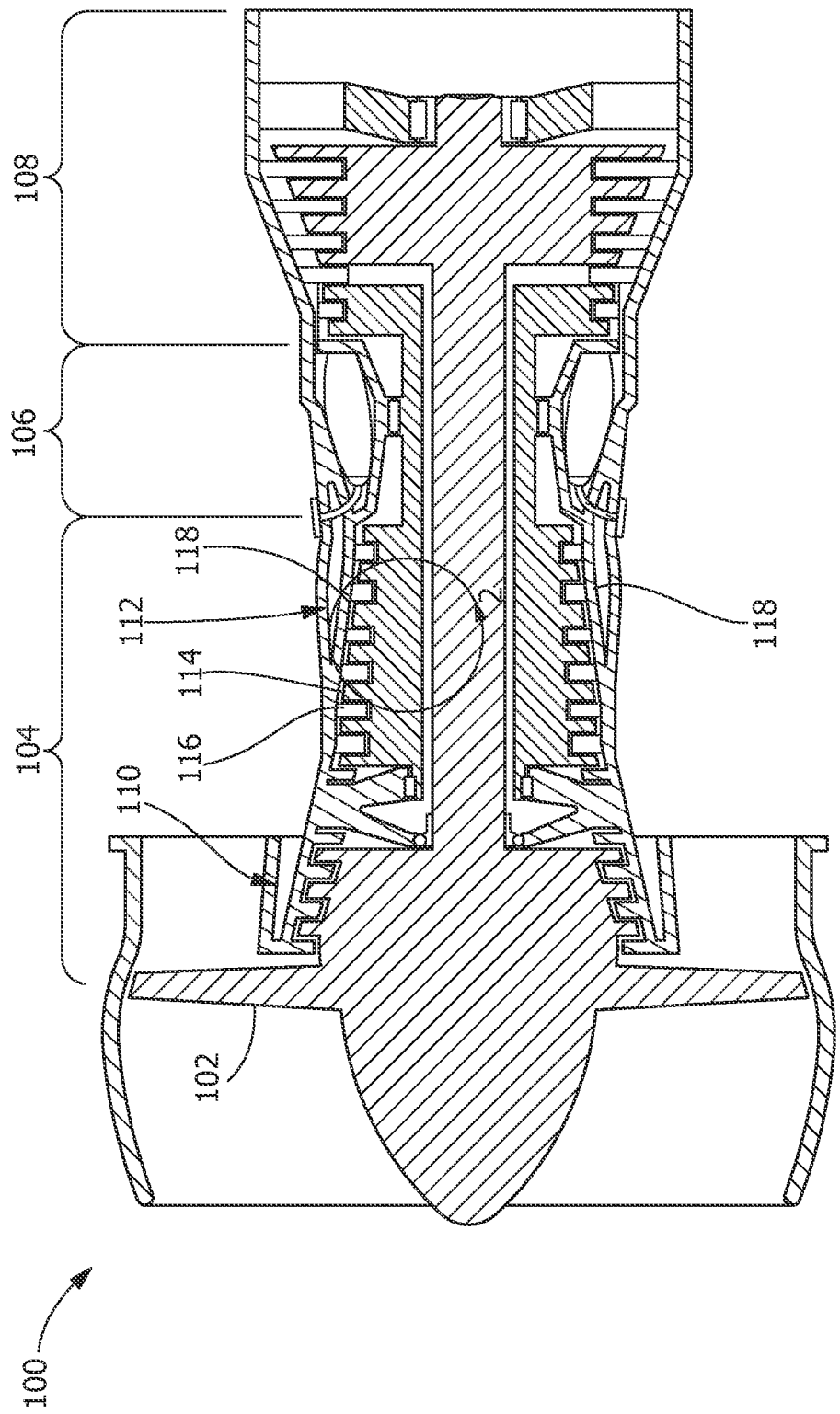
FIG. 1 is schematic illustration of a gas turbine engine of the present disclosure.

FIG. 1 is a schematic illustration of a gas turbine engine 100 including a fan assembly 102, a high pressure compressor 104, and a combustor 106. Gas turbine engine 100 also includes a high pressure turbine 108 and a low pressure turbine 110. Gas turbine engine 100 has an intake side 128 and an exhaust side 130. Although depicted as a gas turbine engine, it should be understood that the concepts described herein are not limited to use with gas turbines as the teaching may be applies to other types of engines, including steam turbine engines, turbo fan engines, and others.

Figure 2:
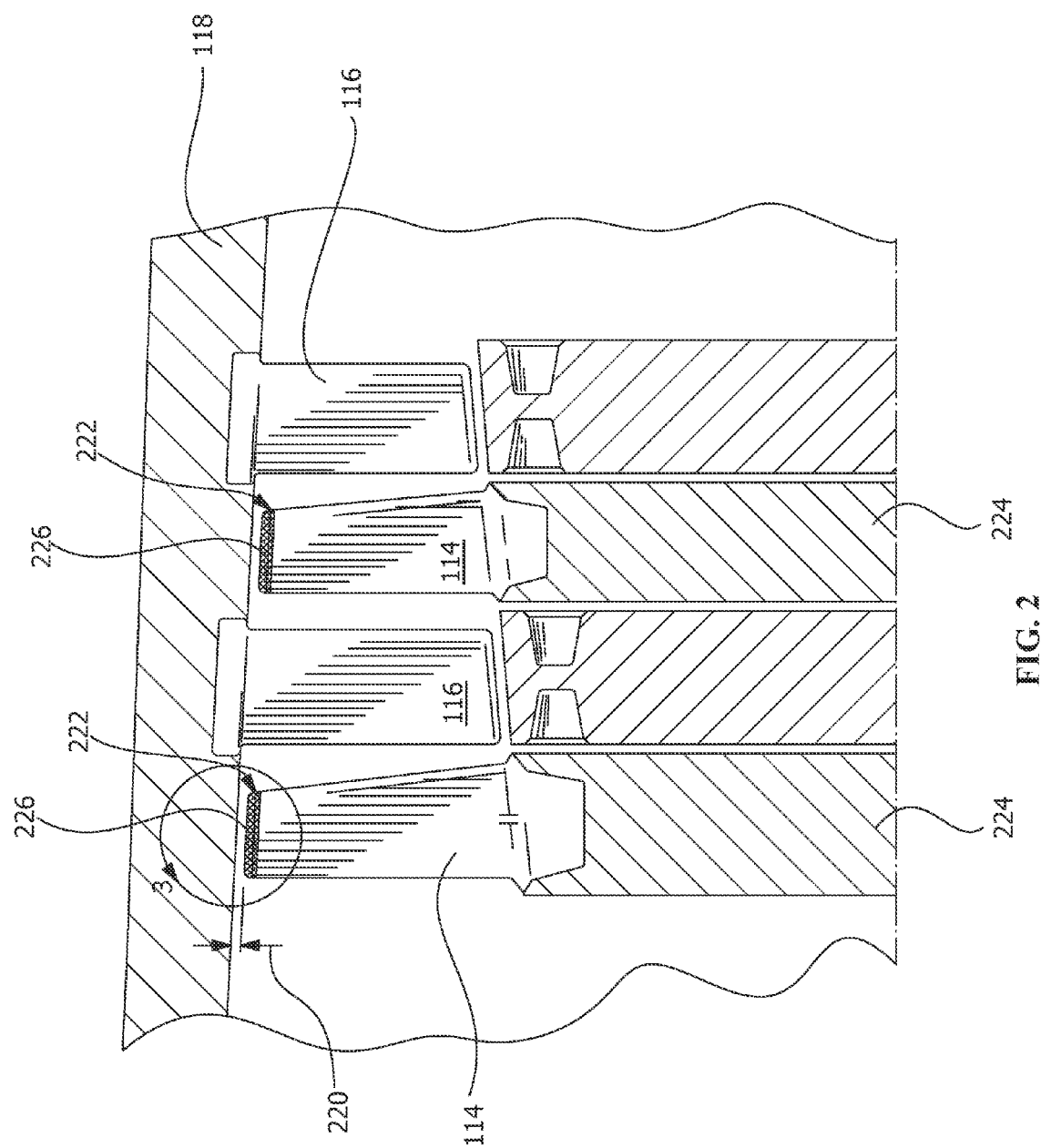
FIG. 2 is an enlarged view of the compressor components of the gas turbine engine shown in FIG. 1.

In FIG. 1, the gas turbine engine 100 includes a low pressure compressor 110 and a high pressure compressor 112. Each of the compressors incorporates rotating sets of airfoils (e.g., blade 114) and stationary sets of airfoils (e.g., vane 116). The stationary set of airfoils 116 are embedded in the static portion 118 (e.g. casing) of the gas turbine engine 100. The rotating airfoils 114 are disposed adjacent to the static portion 118 which creates a static flow path or gap 220 (see FIG. 2). In FIG. 2, the clearance or gap 220 is shown between the rotating airfoils 114 and static portion 118; however, upon start-up and shut down of the gas turbine engine 100, the tip 226 of the rotating airfoil 114 can come into contact with the static portion 118, called a tip-rub.

Figure 3:
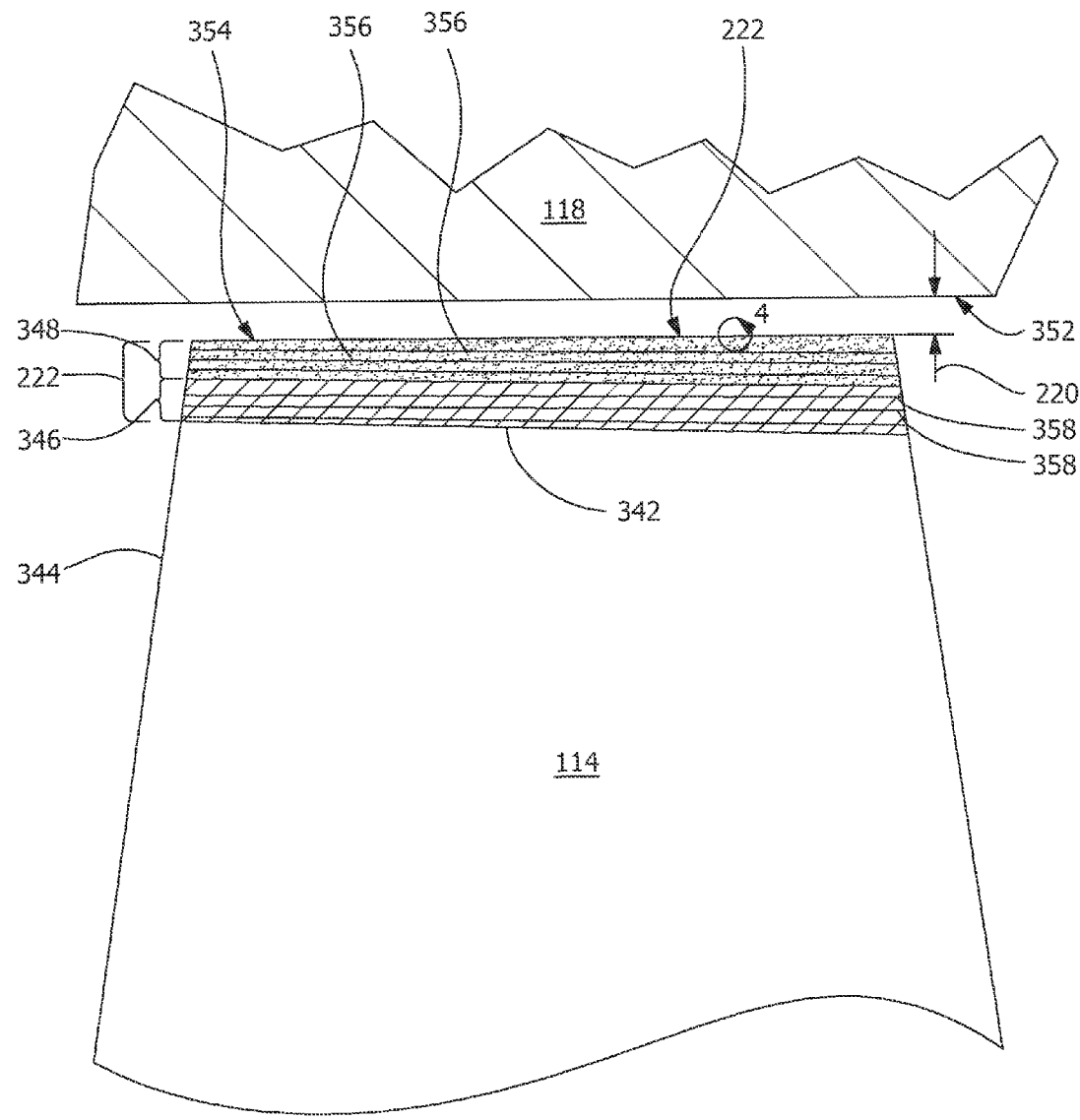
FIG. 3 is an enlarged view of the rotating airfoil and static portion of the compressor components shown in FIG. 2.

FIG. 3 is an enlarged schematic of the rotating airfoil 114 and static portion 118 of the compressor 104 of the engine 100 shown in FIG. 2. The rotating airfoil 114 includes a tip 226 having a coating 222 applied to the surface 342 of the substrate 344. The coating 222 includes a transitional zone 346 applied to the substrate 344 and an abradable zone 348 applied to the transitional zone 346. The coating 222 withstands the rotational force that the rotating airfoil 114 is subjected to during operation of the gas turbine engine 100. In one embodiment, the coating 222 is applied to a new rotating airfoil 114 to reduce the likelihood of damage to the rotating airfoil 114. In another embodiment, the coating 222 is used to repair and extend the service life of the rotating airfoil 114. The abradable zone 348 of the coating 222 is consumed upon contact with the static portion 118 of the gas turbine engine 110, during an event, such as, but not limited to, tip-rub. During a contact event, such as tip-rub, the coating surface 354 of the airfoil 114 comes in contact with the surface 352 of the static portion 118 or casing of the gas turbine engine 100. The contact between the coating surface 354 of the airfoil 114 and the surface 352 of the static portion 118 generally occurs during start-up or shut-down with each revolution of the airfoil 114. This high speed contact causes the abradable layer 348 to wear off or discharge from the airfoil 114, instead of the contact force being absorbed by the airfoil 114, which could cause damage to the root, tip, or other portions of the rotating airfoil 114.

The substrate 344 of the airfoil 114 is selected from materials, such as, but not limited to, stainless steel alloys, nickel-based alloys, titanium alloys, aluminum alloys, aluminum-lithium alloys, and combinations thereof. Examples of suitable stainless steel alloys are, but not limited to, 17-4PH, 13-8PH, 15-5PH, M152. Examples of suitable nickel-based alloys are, but not limited to Inconel 600, Inconel 617, Inconel 625, and Inconel 718. Examples of suitable titanium alloys are, but not limited to Ti6-4 and Ti6-2-2-2.

Figure 5:
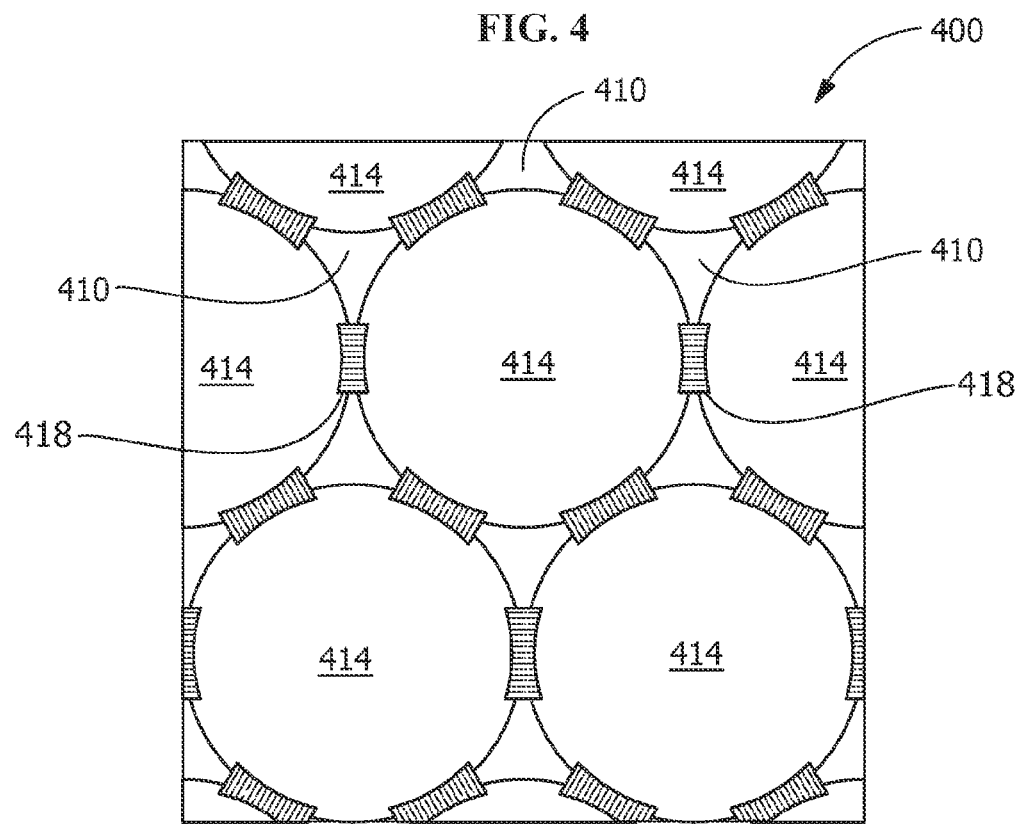
FIG. 5 is an enlarged schematic of fused powered system the rotating airfoil shown in FIG. 3.

As shown in FIG. 3, the transitional zone 346 as applied to the surface 324 of the substrate 344 includes at least one transitional layer 358 of a fused powder composition 400 (see FIG. 5). The fused powder composition 401 includes a plurality of powder particles 412 fused, melted or joined together by an energy source to form the transitional layer 358. The transitional zone 346 is applied using any suitable technique generally including thermal energy. Examples of thermal energy application methods for applying the transitional zone 346, are, but not limited to, an electro-spark deposition (ESD) process, an electron beam welding process, a laser powder fusion welding process, a direct metal laser sintering process, and combinations thereof.

Figure 4:
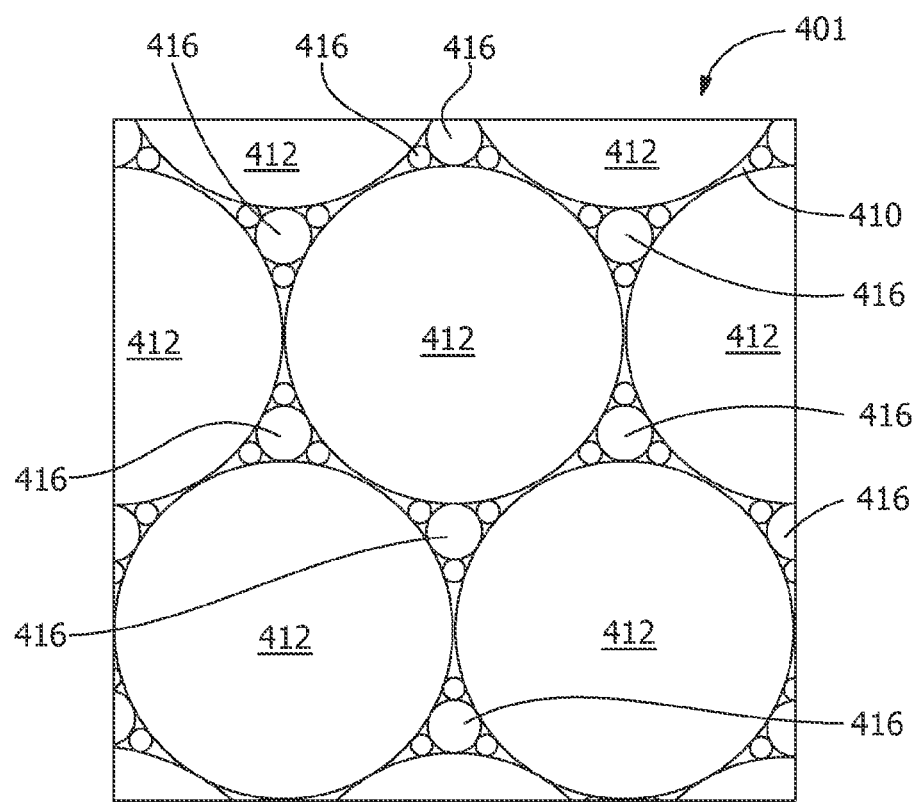
FIG. 4 is an enlarged schematic of the pre-fused powder system of the rotating airfoil shown in FIG. 3.

The abradable zone 348, shown in FIG. 3, includes at least one layer, but generally includes a plurality of abradable layers 356 including a fused powder composition 400 (see FIG. 5). The fused powder composition 400 includes a plurality of powder particles 412 fused, melted or joined together by an energy source to form the abradable layer 356. The abradable zone 348 is applied using any suitable technique, including, but not limited to, an electro-spark deposition (ESD) process, an electron beam welding process, a laser powder fusion welding process, a direct metal laser sintering process, and combinations thereof. As shown in FIG. 4, in one embodiment, the pre-fused powder composition 401 includes a plurality of powder particles 412 and binder particles 416, dispersed amongst the powder particles 412. As the energy source is applied to the nominal unit cells of powder particles 412, the binder particles 416 melt or disperse and the powder particles 412 join together at adjacent surfaces to form the abradable layer 356. In one embodiment, laser beam may be focused on an approximately 2 millimeters to approximately 10 millimeters, or alternatively 3 milliliters to approximately 8 millimeters, or approximately 4 millimeters to approximately 6 millimeters diameter patch of powder particles 412. The thermal energy from laser beam generally penetrates approximately 0.2 millimeters to approximately 2 millimeters, or alternatively 0.3 millimeters to approximately 1.8 millimeters to approximately 0.4 millimeters to approximately 1.7 millimeters into the powder particles 412, thereby simultaneously evolving or volatizing binder particles 416 from the system and fusing adjacent non-binder particles 412 into fused powder particles 414 (see FIG. 5).

As shown in FIG. 4, the pre-fused powder composition 401 for either the transitional layers 358 or the abradable layers 356 includes a plurality of powder particles 412 and binder particles 416 inter-dispersed amongst the powder particles 412 with a minimal amount of void space 410 therebetween. As shown in FIG. 4, there is an optimal packing density between the powder particles 412 and the binder particles 416, such that the particle size of the binder particles 416 is approximately the square root of the powder particles 412. In another embodiment, the powder particles 412 and binder particles 416 can be ordered or randomly dispersed. The plurality of powder particles 412 and binder particles 416 are deposited on the surface 342 of the substrate 344, as a single layer or a plurality of layers using any suitable technique, such as, for example, but not limited to powder deposition. As the energy source is applied to the pre-fused powder composition 401 the binder particles 416 melt or disintegrate and the powder particles 412 are joined together at a fusion zone 418 to form a plurality of fused powder particles 414 (see FIG. 5) that form a transitional layer 358 or an abradable layer 356.

In one embodiment, the binder particles 416 are selected from a material capable of melting, disintegrating or vaporing at approximately 150° C. or greater. For example, the binder particle 416 material is, but not limited to, a volatile wax, which vaporizes at approximately 150° C. to approximately 300° C. In one embodiment, the ratio of volume of the binder particles 416 to the powder particles 412 is approximately 0.1 percent to approximately 50 percent binder particles 416, or alternatively 3 percent to approximately 35 percent binder particles 416, or alternatively 5 percent to approximately 25 percent binder particle 416. In one embodiment the binder particles 416 have a particle size of approximately 0.010 millimeters to approximately 0.150 millimeters, or alternatively approximately 0.040 millimeters to approximately 0.100 millimeters, or alternatively approximately 0.050 millimeters to approximately 0.090 millimeters.

For the transitional layers 358, in one embodiment, the plurality of powder particles 412 of the pre-fused powder composition 401 are selected from a material that is substantially the same as material that is used for the substrate 344. In this embodiment, the materials of the substrate 344 and the transitional zone 346 are substantially the same, but the density of the transitional zone 346, because of the method of application, is less than that of the substrate 344. Using substantially same material for the substrate 344 and the transitional zone 346 promotes adhesion of the transitional zone 346 to the substrate 344 during high-speed rotation. The transitional zone 346 functions as an adhesive region effectively joining or adhering the abradable zone 348 to the substrate 344.

The thickness of the transitional zone 346 is approximately less than 10% of the overall rotating airfoil 114 (blade) length. The powder particles 412 of the transitional zone 346 have a particle size of approximately 0.010 millimeters to approximately 0.150 millimeters, or alternatively approximately 0.040 millimeters to approximately 0.100 millimeters, or alternatively approximately 0.050 millimeters to approximately 0.090 millimeters.

For the abradable zone 348 which includes at least one abradable layer 356 the plurality of powder particles 412, before fusing, have a particle size of approximately 0.020 millimeters to approximately 0.50 millimeters, or alternatively approximately 0.050 millimeters to approximately 0.300 millimeters, or alternatively approximately 0.080 millimeters to approximately 0.150 millimeters. In one embodiment, the powder particles 412 in the abradable zone are the same size.

In one embodiment, the powder particles 412 for the abradable zone 348 contains approximately 10 percent to approximately 60 percent less of the strengthening elements that make up the substrate 344. In one embodiment, the material for the abradable zone 348 is a stainless steel having a reduced carbon content compared to that of the substrate 344 material selected from stainless steel. In another embodiment, the material for the abradable zone 348 contains a proportionally lower amount of alloying elements to achieve a lower overall strength that that of the substrate 344 material. In one embodiment, the abradable zone 348 has a reduced hardness of approximately 140 Brinell to approximately 380 Brinell or alternatively approximately 150 Brinell to approximately 300 Brinell or alternatively approximately 160 Brinell to approximately 250 Brinell. A critical performance aspect of the abradable zone 348 is that the abradable zone does not transmit excess heat into the rotating airfoil 114 or blade and does not transmit excess load into rotating airfoil 114, this accomplished by the abradable zone 348 being sacrificed during a tip-rub or similar contact event between the surface of the rotating airfoil 114 and the static portion 118 or casing of the gas turbine engine 100.

In another embodiment, the abradable zone 348 has a yield strength of approximately 344 Megapascal to approximately 1724 Megapascal or alternatively approximately 360 Megapascal to approximately 1720 Megapascal or alternatively approximately 400 Megapascal to approximately 1700 Megapascal. In an embodiment, the abradable zone 348 has a thickness of approximately 0.06 millimeters to approximately 100 millimeters or alternatively approximately 0.12 millimeters to approximately 15 millimeters or alternatively approximately 0.8 millimeters to approximately 5 millimeters.

Figure 7:
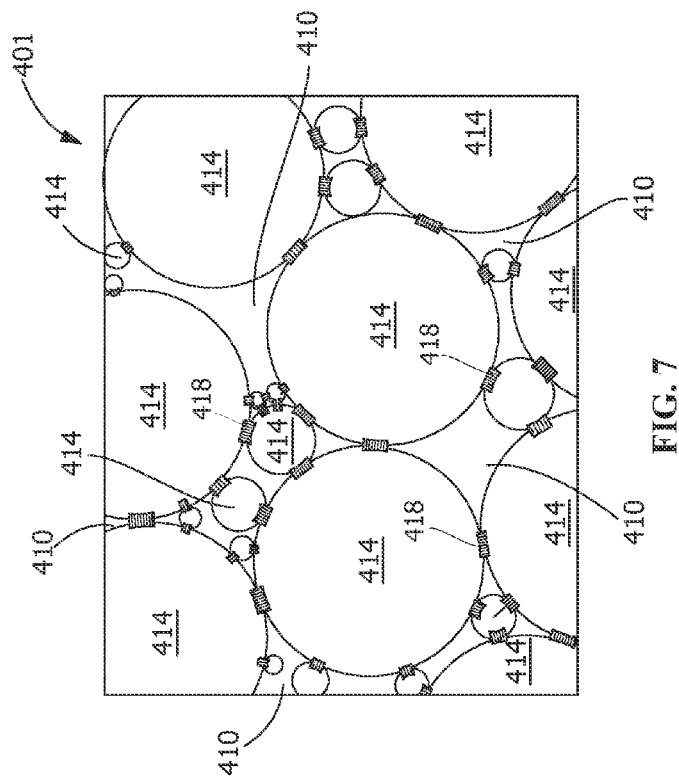
FIG. 7 is a schematic of the fused powdered system of an alternative embodiment of the present disclosure.
Figure 6:
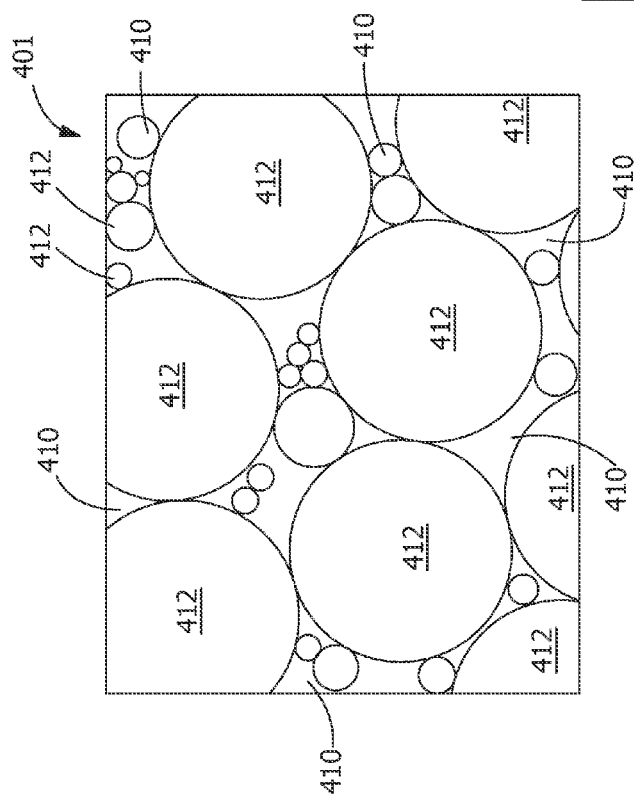
FIG. 6 is a schematic of the pre-fused powder system of an alternative embodiment of the present disclosure.

As shown in FIG. 6, the pre-fused powder composition 401 for either the transitional layers 358 or the abradable layers 356 includes a plurality of powder particles 412 having void areas 410 randomly dispersed throughout. In this embodiment, the plurality of powder particles 412 are randomly dispersed and vary in particle size. The desired density for the transitional layers 358 and abradable layers 356 determines the powder particle 412 size, shape, positioning, packing density, and packing order. In another embodiment, the powder particles 412 are ordered or optimally dispersed as depicted in FIG. 4. In another embodiment, the plurality of powder particles 412 are approximately the same size. After energy is applied, as shown in FIG. 7, the plurality of particles 412 become a fused powder composition 400, with a plurality of fused particles 414 joined together at a fusion zone 418 having a number of void areas 410. The void areas 410 provided the reduced density to the transitional layers 358 of the transitional zone 346 and abradable layers 356 of the abradable zone 348.

FIG. 8 is a schematic of another embodiment of a rotating component of the present disclosure. The air foil 114 includes a substrate 344, a transitional zone 346 and an abradable zone 348 including a abradable zone coating 350. FIG. 9 is a cross-section taken along line 9-9 of FIG. 8 illustrating the various layers of the rotatable component 114. As shown in FIG. 9, and described above in more detail the transitional zone 346 includes at least one transitional layer applied to the surface 342 of the substrate 344. The transitional zone 346 is applied using any suitable method described above. The abradable zone 348 is applied to the transitional zone 346 by any suitable method described above. In this embodiment, the abradable zone 348 includes a plurality of abradable layers 356. The plurality of abradable layers 356 include a plurality of fused powder structures 420. The plurality of fused powder structures include a plurality of fused powder particles 414 and void areas 410. The geometry of the plurality of fused powder structures 420 includes selectively hollowed spheres (as shown in FIG. 9), selectively hollowed pyramids, and other various geometries that allow for the abradable zone 348 to remain fixed to the transitional zone 346 while rotating. The three-dimensional geometries of the fused powder structures 420 are created using a 3-D laser sinter process. After the abradable zone 348 is applied an abradable coating layer 350 is applied to the abradable zone 348. The abradable coating layer 350 or skin prevents unnecessary airflow through the void areas 410 of the fused powder structures 420 (see FIG. 8).

The abradable coating layer 350 material is selected from the same material as the abradable zone. In one embodiment, the abradable coating layer is applied using a 3-D laser sintering process, in another embodiment the abradable coating layer is applied using any other suitable coating process. The abradable coating layer 350 thickness is approximately 0.06 millimeters to approximately 10 millimeters or alternatively approximately 0.12 millimeters to approximately 8 millimeters or alternatively approximately 0.8 millimeters to approximately 5 millimeters.

In another embodiment, a coating 222 for a rotating airfoil 222 is provided. The coating includes a transitional zone 346 applied to a substrate 344 and an abradable zone 348 applied to the transitional zone 346. The abradable zone 348 includes a plurality of abradable layers 356 including a plurality of fused powder particles 414 (see FIG. 5) or a plurality of fused powder structures 420 (see FIG. 9). In one embodiment, the abradable zone 348 includes an abradable coating layer 350. The coating 222 withstands rotational force and the abradable zone 348 is consumed upon contact with a static portion 118 of a gas turbine engine 100.

A method of coating a rotatable engine component 114 is provided. The method includes providing the rotatable engine component 114 having a substrate 344. Applying a transitional zone 346 to the surface 342 of the substrate 344. Applying an abradable zone 348 to the transitional zone 346, wherein the abradable zone 348 is consumed upon contact with a static portion 118 (e.g. case liner of a gas turbine engine) of the engine 100. In one embodiment, the transitional zone 346 is applied using thermal energy. The transitional zone 346 acts an intermediate or adhesive layer to keep the abradable zone 348 from detaching from the substrate 344 during rotation. In one embodiment, the abradable zone 348 is applied using a laser densification process, a laser powder fusion welding process, a direct-metal laser sintering process, an electron beam welding process, an electrostatic deposition process, and combinations thereof.

In one embodiment, the surface 342 of the substrate 344 of the rotatable gas turbine component 114 is optionally prepared before applying the transitional zone. In repairing the coating 222, the optional step of preparation includes removal of any remaining existing abradable layers 356 or transitional layers 358 from the surface 342 of the substrate 344. Examples of processes used for removal are, but not limited to, any method for flattening the surface 342 of the substrate 344, such as, but not limited to, grinding and sanding.

One advantage of an embodiment of the present disclosure includes an engine having tighter clearance control between the blade tip and casing.

Another advantage of an embodiment of the present disclosure is high compressor efficiency resulting from the tighter clearances of compressor design.

Another advantage of an embodiment of the present disclosure is robust compressor operation because the air foil damage is removed when tip rub occurs between the air foil tip and casing.

Another advantage of an embodiment of the present disclosure is that inspections and blending of airfoils in the field is eliminated.

Yet another advantage of an embodiment of the present disclosure is the abradable tip allows the blade to withstand high speed contact with the casing without suffering detrimental effects associated with tip rub.

Another advantage of an embodiment of the present disclosure is the compressor can continue to run without causing danger of crack initiation at the airfoil tip or root after a tip rub event.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A rotatable engine component comprising:
a substrate;
a transitional zone applied to the substrate; and
an abradable zone applied to the transitional zone, wherein the abradable zone is more abradable than a static portion of an engine and is consumed upon contact with the static portion of the engine,
wherein the rotatable engine component is a compressor airfoil,
wherein the abradable zone comprises a plurality of abradable layers, and
wherein each layer of the plurality of abradable layers consists of a plurality of fused metallic powder particles having selectively hollowed predetermined geometries, a plurality of fused metallic powder structures having selectively hollowed predetermined geometries, or combinations thereof having selectively hollowed predetermined geometries.

2. The rotatable engine component of claim 1, wherein the substrate is selected from a substrate material comprising stainless steel alloys, nickel-based alloys, titanium alloys, aluminum alloys, aluminum-lithium alloys, and combinations thereof.

3. The rotatable engine component of claim 1, wherein the transitional zone comprises at least one transitional layer of a fused powder composition.

4. The rotatable engine component of claim 3, wherein the fused powder composition comprises a plurality of powder particles.

5. The rotatable engine component of claim 4, wherein the plurality of powder particles of the transitional zone are selected from a material that is substantially the same as the substrate material.

6. The rotatable engine component of claim 4, wherein the plurality of powder particles of the transitional zone have a particle size of approximately 0.010 millimeters to approximately 0.150 millimeters.

7. The rotatable engine component of claim 1, wherein the plurality of fused powder particles of the abradable zone have a particle size of approximately 0.020 millimeters to approximately 0.150 millimeters.

8. The rotatable engine component of claim 1, wherein the abradable zone has a thickness of approximately 0.06 millimeters to approximately 100 millimeters.

9. A coating for a rotatable component comprising:
a transitional zone applied to a substrate of the rotatable component; and
an abradable zone applied to the transitional zone, the abradable zone comprising a plurality of abradable layers including a plurality of fused powder particles, wherein the coating withstands rotational force and the abradable zone is more abradable than a static portion of the engine and is consumed upon contact with the static portion of the engine,
wherein the rotatable engine component is a compressor airfoil,
wherein the abradable zone comprises a plurality of abradable layers, and
wherein each layer of the plurality of abradable layers consists of a plurality of fused metallic powder particles having selectively hollowed predetermined geometries, a plurality of fused metallic powder structures having selectively hollowed predetermined geometries, or combinations thereof having selectively hollowed predetermined geometries.

10. The coating of claim 9, wherein the plurality of fused powder particles have a particle size of approximately 0.020 millimeters to approximately 0.150 millimeters.

11. The coating of claim 9, wherein the abradable zone has a reduced hardness of approximately 140 Brinell to approximately 380 Brinell.

12. A method of coating a rotatable engine component comprising:
providing the rotatable engine component having a substrate;
applying a transitional zone to the substrate; and
applying an abradable zone to the transitional zone, wherein the abradable zone is more abradable than a static portion of the engine and is consumed upon contact with the static portion of the engine,
wherein the rotatable engine component is a compressor airfoil,
wherein the abradable zone comprises a plurality of abradable layers, and
wherein each layer of the plurality of abradable layers consists of a plurality of fused metallic powder particles having selectively hollowed predetermined geometries, a plurality of fused metallic powder structures having selectively hollowed predetermined geometries, or combinations thereof having selectively hollowed predetermined geometries.

13. The method of claim 12, wherein the surface of the substrate of the rotatable component is prepared before applying the transitional zone.

14. The method of claim 12, wherein the transitional zone is applied using thermal energy.

15. The method of claim 12, wherein the transitional zone has a thickness of approximately less than ten percent of an overall length of the compressor airfoil.

16. The method of claim 12, wherein the abradable zone is applied using a laser densification process, a laser powder fusion welding process, a direct-metal laser sintering process, an electron beam welding process, an electrostatic deposition process, or combinations thereof.

17. The method of claim 12, wherein the abradable zone has a thickness of approximately 0.06 millimeters to approximately 100 millimeters.

* * * * *